United States Patent
Awano et al.

(10) Patent No.: US 6,874,843 B2
(45) Date of Patent: Apr. 5, 2005

(54) VEHICLE FRONT-END BODY STRUCTURE

(75) Inventors: Masahiro Awano, Okazaki (JP);
Kazufumi Takayanagi, Okazaki (JP);
Takanobu Uchida, Anjo (JP);
Yoshinori Yokota, Nagoya (JP);
Hiroyuki Kurokawa, Nissin (JP)

(73) Assignees: Mitsubishi Jidosha Kogyo Kabushiki Kaisha (JP); Mitsubishi Jidosha Engineering Kabushiki Kaisha (JP)

( * ) Notice: Subject to any disclaimer, the term of this patent is extended or adjusted under 35 U.S.C. 154(b) by 0 days.

(21) Appl. No.: 10/640,180

(22) Filed: Aug. 13, 2003

(65) Prior Publication Data

US 2004/0066062 A1 Apr. 8, 2004

(30) Foreign Application Priority Data

Aug. 13, 2002 (JP) ........................................ 2002-235432

(51) Int. Cl.[7] .............................................. B62D 25/08
(52) U.S. Cl. .............. 296/203.02; 296/205; 296/187.09
(58) Field of Search ....................... 296/203.01–203.02, 296/205, 187.09, 187.1, 203.2

(56) References Cited

U.S. PATENT DOCUMENTS

| | | | | |
|---|---|---|---|---|
| 2,177,896 | A | * 10/1939 | Lee | 296/205 |
| 2,269,451 | A | * 1/1942 | Ford | 296/205 |
| 2,627,437 | A | * 2/1953 | Toncray et al. | 296/203.01 |
| 3,625,561 | A | * 12/1971 | Huber | 296/187.09 |
| 6,179,372 | B1 | * 1/2001 | Sakamoto et al. | 296/203.02 |

FOREIGN PATENT DOCUMENTS

| | | |
|---|---|---|
| EP | 0 987 169 A | 3/2000 |
| JP | 4-262975 | 9/1992 |
| JP | 2000-153779 A | 6/2000 |

* cited by examiner

Primary Examiner—Dennis H. Pedder
(74) Attorney, Agent, or Firm—Rossi, Kimms & McDowell

(57) ABSTRACT

A vehicle front-end body structure, includes: front side members provided along a left side and a right side of a front portion of a vehicle body, a front deck cross member provided between side walls of the vehicle body, including joint portions for joining the front deck cross member to the side walls; and a connecting member made up of a pipe material including end portions and a middle portion disposed between the end portions. The end portions are joined to the vicinities of the joint portions respectively. The middle portion is joined to the front side members respectively.

10 Claims, 4 Drawing Sheets

INPUT WHEN VEHICLE COLLIDES

TENSION — TENSION
AXIAL FORCE — AXIAL FORCE
COMPRESSIVE FORCE

INPUT WHEN VEHICLE COLLIDES

VEHICLE FRONT-END BODY STRUCTURE

BACKGROUND OF THE INVENTION

1. Field of the Invention

The present invention relates to a vehicle front-end body structure.

2. Background Art

As recent demands for passenger vehicles, design for the passenger vehicles has been changed such that a deck is placed more forward or a "deck forward design" is adopted so as to expand a space within a passenger compartment. As a result, front side members of the vehicles tend to be shorter in length. Due to this, it is difficult to secure a sufficient impact absorption performance for a vehicle employing a crushable body for absorbing an impact at the time of crash.

For example, as shown in FIG. 3, front side members 100 are provided at a front end of a vehicle body on left and right sides thereof extending in a longitudinal direction of the vehicle. The front side members 100 are bent downwardly at positions directly below or in front of a front deck cross member 102 extending between left and right front pillars 101. The front side members 100 are then bent again to become horizontal so as to be level with a floor surface of the vehicle body.

The design for the front side members 100 allows the surface D of a toe board (or a dash panel) (refer to FIG. 4) to be set at a more forward position of the body thereby to attain an attempt to expand the space in the passenger compartment. On the other hand, the front side members 100 are designed not only to mainly carry input loads generated when the vehicle collides (frontal and offset collisions) but also to collapse in an accordion fashion at front ends thereof to thereby absorb impact energy.

With the front side members 100 constructed as has been described above, however, as shown in FIGS. 4A–4C, there has been a risk that a substantially Z-shaped bending (a Z-bending) (a deformation of the front side member shown in FIG. 4B from a condition illustrated by broken lines to a condition illustrated by solid lines) is easy to be generated by virtue of an input (refer to an arrow in FIG. 4A) when the vehicle collides, whereby the receding distance of the toe board surface D becomes large. Furthermore, in the event that there is made an excessive input when the vehicle collides, there has been a risk that a portion 102 of the floor side member 100 which is disposed underneath a bottom side of the floor panel is buckled, as shown in FIG. 4C. In addition, as a result of the generation of the Z-bending in the front side member 100, there is caused a risk that the crushable length (the length of the portion of the front side member 100 which is designed to collapse in the accordion fashion so as to absorb the impact) of the front side member 100 is reduced, whereby the impact absorption amount is reduced, resulting in an increase in the deformation amount of the passenger compartment (cabin).

To cope with this, JP-A-4-262975 discloses a front-end body structure as follows: In the front-end body structure, in order to increase an impact repulsive force at a portion where the front side member is joined to a dash lower panel and to enhance the energy absorption amount through the plastic deformation of the front side member, an impact load inputted into a front bumper is transmitted from a primary reinforcement member of a radiator core support to a cowl box via a reinforcement portion of a hood ridge panel (the top of a wheel well panel) and a secondary reinforcement member. As a result, the moment around a supporting portion as a fulcrum acts on the secondary reinforcement member.

In the front-end body structure disclosed in the Japanese patent publication, however, the impact input transmission path becomes long (roundabout), and the number of components involved is increased. Accordingly, this calls for a drawback that the front-end body structure becomes complex, whereby the production costs become high.

SUMMARY OF THE INVENTION

An object of the invention is to provide an automobile front-end body structure which can increase the energy absorbing amount by suppressing the Z-bending of the front side members when the vehicle collides with a simple structural modification while attaining an attempt to create a more favorable design image by creating more space in the passenger compartment and placing the deck more forward.

To attain the object, the invention provides a vehicle front-end body structure, including: a connecting member that connects a pair of front side members with the vicinity of a joint portion, the pair of front side members respectively provided along a left front side portion and a right front side portion of a vehicle body, the joint portion for joining one of front side walls of the vehicle body with a front deck cross member provided between the front side walls; the connecting member includes a pair of connecting member components, each provided at the left side and the right side of the vehicle body respectively; and the pair of connecting member components are integrally connected to each other at a position between the pair of front side members.

Accordingly, an input into the front side members when the vehicle collides is dissipated to the side walls of the vehicle body via the connecting member.

A quadrangular frame-like framework maybe formed by the connecting member in cooperation with the front deck cross member. In addition, the connecting member may be made up of a single member.

Preferably, the connecting member includes a pipe material. Accordingly, the strength of the vehicle front-end structure can be further increased, while the costs can be reduced.

The invention may provide a vehicle front-end body structure, including front side members provided along a left side and a right side of a front portion of a vehicle body; a front deck cross member provided between side walls of the vehicle body, including joint portions for joining the front deck cross member to the side walls; and a connecting member made up of a pipe material including end portions and a middle portion disposed between the end portions. The end portions are joined to the vicinities of the joint portions respectively. The middle portion is joined to the front side members respectively. Accordingly, an input into the front side members when the vehicle collides is dissipated to the side walls of the body via the connecting member. In addition, a quadrangular frame-like framework may be formed by the connecting member in cooperation with the front deck cross member. Furthermore, the connecting member may be made up of a pipe material, whereby attempts to increase the strength further and to reduce the costs more can be attained.

Preferably, the front side members are provided with bent portions each bent downwardly as the front side members extend from side portions of an engine compartment of the vehicle body toward a floor surface of the vehicle body. The connecting member is joined to the bent portions.

Accordingly, an input into the front side members when the vehicle collides is effectively dissipated to the side walls of the body via the connecting member.

Preferably, the connecting member is formed as substantially a U-like shape opening upwardly and having a bottom side, the bottom side including corner portions at both ends thereof. The corner portions are joined to the bent portions. Accordingly, a quadrangular frame-like framework may be formed by the connecting member in cooperation with the front deck cross member. Furthermore, the bent portions of the front side members and the vicinities of the joints between the front deck cross member and the side walls of the body may be connected to each other by a side of the quadrangular frame-like framework.

BRIEF DESCRIPTION OF THE DRAWINGS

The present invention may be more readily described with reference to the accompanying drawings.

DETAILED DESCRIPTION OF THE PREFERRED EMBODIMENTS

An vehicle front-end body structure according to the invention will be described below based on an embodiment using the accompanying drawings.

Figure 1:
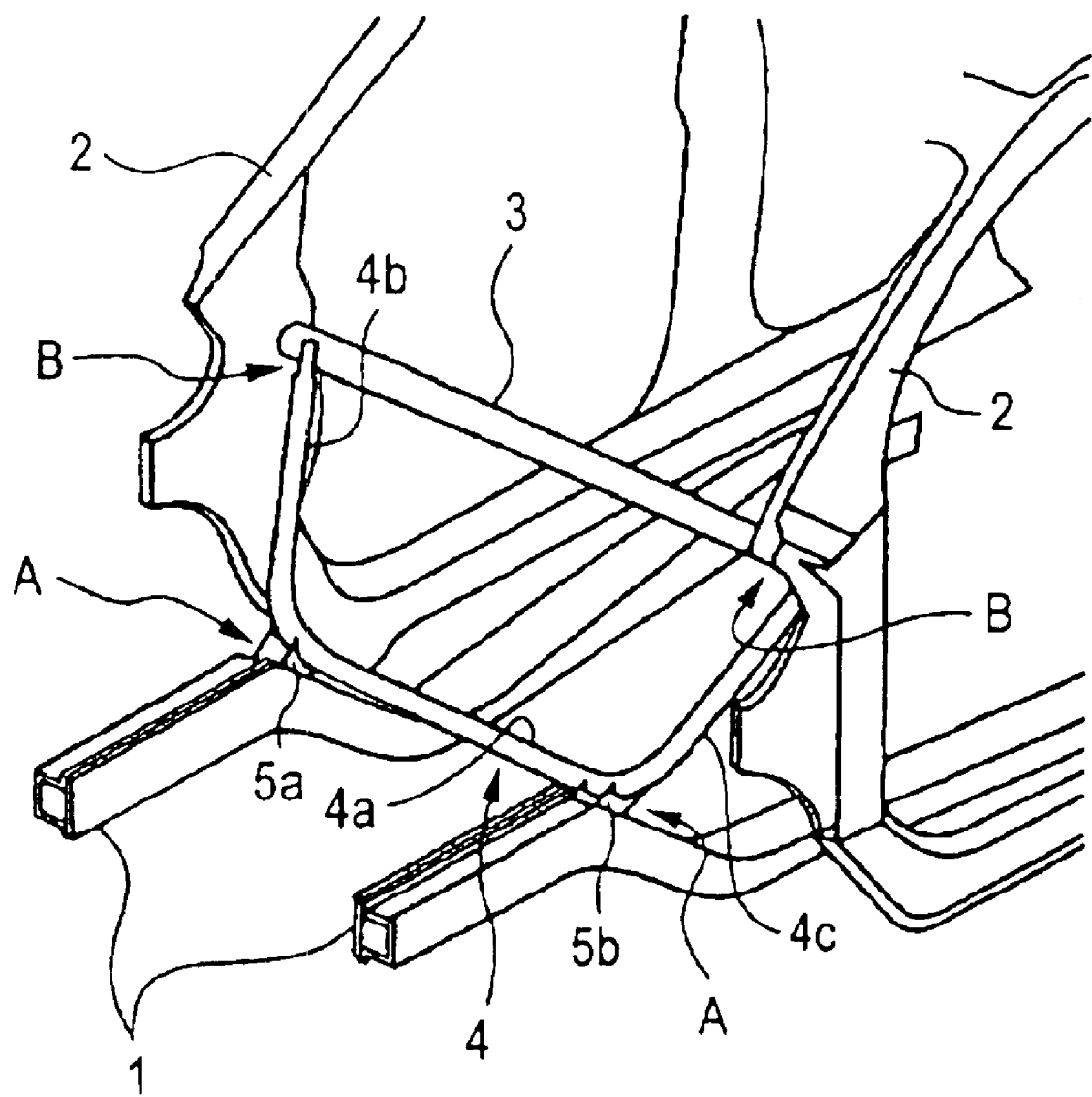
FIG. 1 is a schematic perspective view of a front-end body structure according to an embodiment of the invention.
Figure 2A:
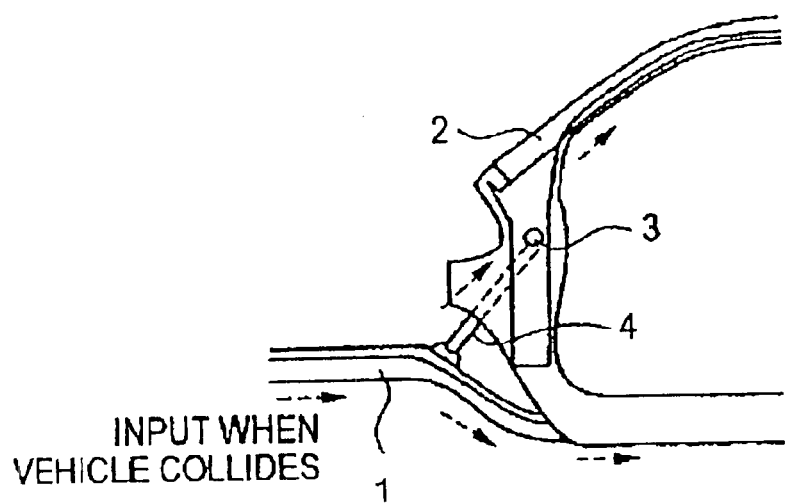
FIGS. 2A and 2B are explanatory views explaining the function of the front-end body structure according to the same embodiment of the invention.
Figure 2B:
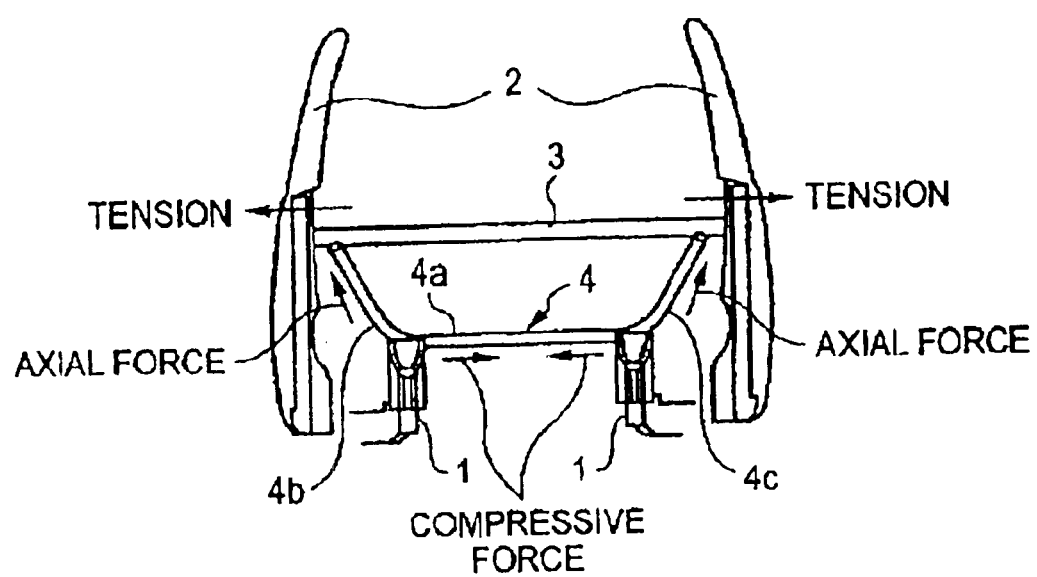
Figure 3:
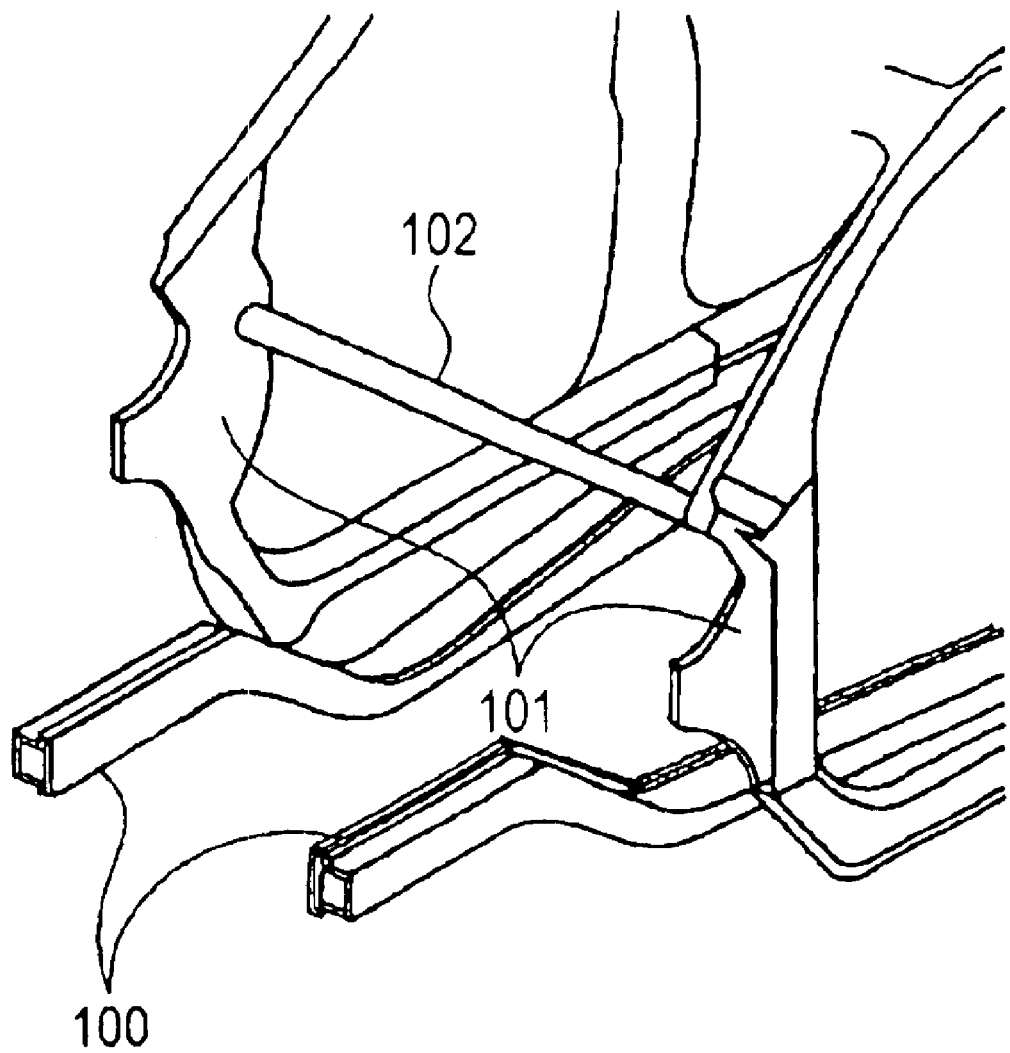
FIG. 3 is a schematic perspective view of a conventional front-end body structure.

FIG. 1 is a schematic perspective view of a front-end body structure according to an embodiment of the invention, and FIGS. 2A and 2B are explanatory views explaining the function of the front-end body structure according to the same embodiment.

As shown in FIG. 1, front side members 1 each having a closed cross-sectional structure are provided at a front part of a body of a vehicle on left and right sides thereof in such a manner as to extend in a longitudinal direction of the vehicle. A front deck cross member 3 made up of a pipe material is provided between left and right front pillars 2 which act as side walls of the body in such a manner as to extend therebetween.

Figure 4A:
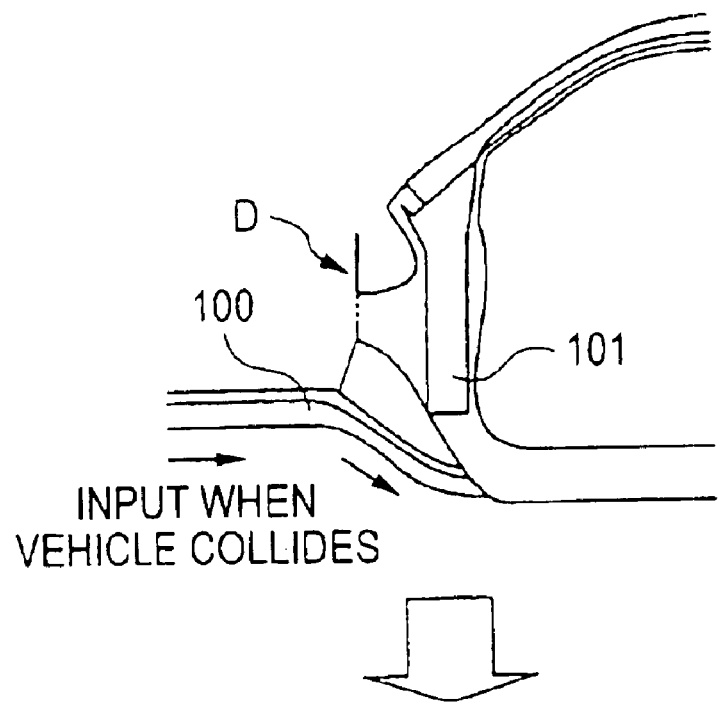
FIGS. 4A–4C are explanatory views showing a drawback inherent in the conventional front-end body structure.
Figure 4B:
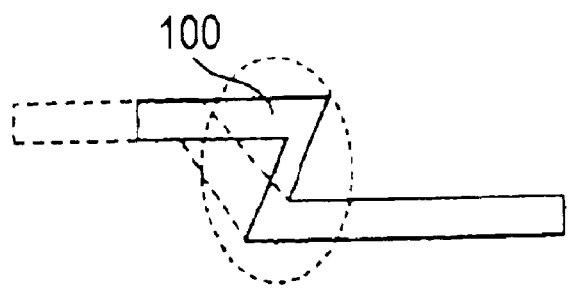
Figure 4C:
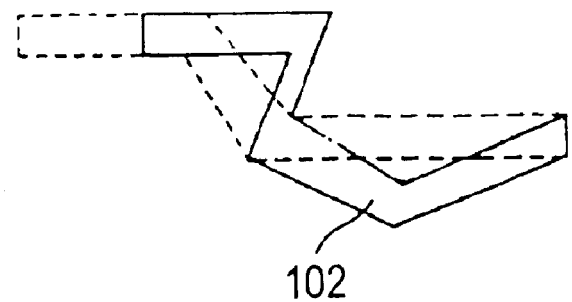

The side members 1 are bent to incline downwardly from a forward position which is apart a predetermined distance from a position directly below the front deck cross member 3 and are then bent again from the position directly below the front deck cross member 3 so as to become horizontal to thereby be substantially level with a floor surface of the body. This design allows a toe board surface D (refer to FIG. 4A) to be set at a more forward position of the body so as to attain an attempt to expand a space in a passenger compartment of the vehicle.

On the other hand, the front side members 1 are designed not only to mainly carry input loads generated when the vehicle collides (frontal collision, ODB (offset deformable barrier) collision) but also to absorb crash energy also generated then through accordion-like collapse of portions of the front side members which are forward of the bent portions A which are bent to incline downwardly.

Then, according to the embodiment, a dash cross member (connecting member) 4 is provided as a member for rigidly connecting the bent portions A of the front side members 1 which are bent to incline downwardly and vicinities of joints B between the front deck cross member 3 and the front pillars 2.

The dash cross member 4 is made up of a single pipe material (a single ember). A middle portion 4a thereof is disposed so as to extend horizontally between the left and right front side members 1 via welding brackets 5a, 5b, and left and right end portions 4b, 4c of the dash cross member 4 are bent upwardly so as to be welded to left and right end portions of the front deck cross member 3, respectively, whereby the dash cross member 4 and the front deck cross member 3 cooperate with each other to form a trapezoidal (quadrangular) frame-like framework.

Since the front-end body structure is constructed as described above, an input into the front side members 1 when the vehicle collides (frontal collision, ODB collision) is, as shown in FIG. 2, dissipated also to the left and right front pillars 2 via the dash cross member 4 (refer to FIG. 2A). A ratio of the load carried by rear portions of the front side members 1 and the front pillars 2 is preferably designed so as to become about 50 to 50.

In addition, the front deck cross member 3 and the dash cross member 4 which are made up of the pipe material effectively function to deal with various types of inputs with their axial forces and tensions. Namely, a large rearward force generated when the vehicle collides is borne by the axial force of the dash cross member 4 at the left and right end portions 4b, 4c thereof, and a lateral force such as an inward bending of the front side frame 1 is effectively borne through tensions (or contractive forces) of the middle portion 4a of the dash cross member 4 and the front deck cross member 3 (refer to FIG. 2B). In addition, since the dash cross member 4 and the front deck cross member 3 cooperate with each other so as to form the trapezoidal (quadrangular) frame-like framework, a more rigid body construction can be provided.

As a result, the energy absorbing amount can be increased by suppressing the Z-bending of the front side members 1 when the vehicle collides with a simple structural modification in which the dash cross member 4 is newly provided while attaining an attempt to create a more favorable design image by creating more space in the passenger compartment and placing the deck more forward. Incidentally, it has been confirmed that the vehicle weight can be reduced by about 10 kilograms when compared with a case where an equivalent energy absorbing performance is tried to be secured using another reinforcement structure which uses no such member as the dash cross member 4 of the invention.

Note that the invention is not limited to the embodiment, and it goes without saying that the invention may be modified variously without departing from the spirit and scope of the invention. For example, the material for the dash cross member 4 is not limited to the pipe material, and other steel materials may be used. In addition, the portion (the middle portion 4a) that is provided to extend between the left and right front side members may not be provided. Furthermore, the dash cross member 4 may be joined with bolts instead of through welding.

As has been described heretofore, according to the invention, since there is provided the automobile front-end body structure, characterized in that the member is provided which connects the front side members provided along the front side portions of the body of an automobile with the vicinities of the joints between the front deck cross member provided so as to extend between the side walls of the body and the side walls of the body, whereby an input into the front side members when the vehicle collides is dissipated to the side walls of the body via the member so provided, the energy absorbing amount can be enhanced by suppressing the Z-bending of the front side members when the vehicle collides with the simple structural modification while attaining an attempt to create a more favorable design image by creating more space in the passenger compartment and placing the deck more forward.

According to the invention, since there is provided the automobile front-end body structure, wherein the member is provided left and right, respectively, and wherein the members so provided are connected to each other between the left and right front side members so as to be formed into the integrated member, whereby the quadrangular frame-like framework is constructed by the member in cooperation with the front deck cross member, there can be provided a more rigid body structure.

According to the invention, since there is provided the automobile front-end body structure, wherein the member is made up of the pipe material, attempts to increase the strength further and to reduce the costs more can be attained.

According to the invention, since there is provided the automobile front-end body structure which comprises the front side members provided along the left and right front side portions of the body of an automobile, the front deck cross member provided so as to extend between the side walls of the body, and the member made up of the single pipe material, the ends of the pipe material being connected, respectively, to the vicinities of the joints between the front deck cross member and the side walls of the body, and the middle portion of the pipe material being connected to both the front side members provided left and right, whereby an input into the front side members when the vehicle collides is dissipated to the side walls of the body via the member so provided, the energy absorbing amount can be enhanced by suppressing the Z-bending of the front side members when the vehicle collides with the simple structural modification while attaining an attempt to create a more favorable design image by creating more space in the passenger compartment and placing the deck more forward. In addition, since the member is made up of the single pipe member, the frame-like framework is constructed by the member in cooperation with the front deck cross member, whereby attempts to increase further the strength of the body structure and to reduce the costs more can both be attained.

According to the invention, since there is provided the automobile front-end body structure, wherein the front side members are bent downwardly as the front side members extend from the side portions of the engine compartment of the body toward the floor surface of the body so as to provide the bent portions, and wherein the member is connected to the bent portions, whereby an input into the front side members when the vehicle collides is effectively dissipated to the side walls of the body via the member so provided, the body structure can be made more rigid.

According to the invention, since there is provided the automobile front-end body structure, wherein the member is provided in such a manner as to form substantially the U-like shape which opens upwardly, and wherein the corner portions at both the ends of the bottom side of the U-like shape are connected to the bent portions, whereby the quadrangular frame-like framework is constructed by the member in cooperation with the front deck cross member, the body structure can be made more rigid by the quadrangular frame-like framework. Furthermore, since the bent portions of the front side members and the vicinities of the joints between the front deck cross member and the side walls of the body are connected to each other by the side of the quadrangular frame-like framework, an input into the front side members when the vehicle collides can be transmitted properly.

What is claimed is:

1. A vehicle front-end body structure, comprising:
   a pair of front side members provided along a left front side portion and a right front side portion of a vehicle body, respectively;
   front side walls provided along a left side and a right side of the vehicle body;
   a front deck cross member provided between and connected to the front side walls of the vehicle body; and
   a connecting member that connects the pair of front side members to the front deck cross member,
   wherein each of end portions of the connecting member is connected to the front deck cross member at a position that is spaced away from the respective side wall, and
   wherein the connecting member and the front deck cross member form a framework having a substantially trapezoidal shape, with a longer base portion thereof positioned above a shorter base portion thereof.

2. The vehicle front-end body structure as claimed in claim 1, wherein the connecting member includes a pipe material.

3. A vehicle front-end body structure, comprising:
   front side members provided along a left side and a right side of a front portion of a vehicle body;
   front side walls provided along a left side and a right side of the vehicle body;
   a front deck cross member connected to and extending between the front side walls; and
   a tubular connecting member joined to the front side members and to at least one of the front deck cross member and the front side walls,
   wherein the front side members each are bent to provide an inclined portion, the tubular connecting member being connected to the inclined portions,
   wherein the tubular connecting member is joined to the end portions of the front deck cross member, and
   wherein the connecting member and the front deck cross member form a framework having a substantially trapezoidal shape, with a longer base portion thereof positioned above a shorter base portion thereof.

4. The vehicle front-end body structure as claimed in claim 3, wherein the front side members have a first portion that extends along a side of an engine compartment and a second portion comprised of the inclined portion, and a third portion that extends along a side of a floor of the vehicle, the second portion extending between the first and third portions.

5. The vehicle front-end body structure as claimed in claim 4, wherein the connecting member is formed as a substantially a U-like shape opening upwardly and having a bottom side, the bottom side including corner portions at both ends thereof; and the corner portions are joined to the bent portions.

6. The vehicle front-end body structure as claimed in claim 3, wherein the tubular connecting member is configured to apply a tensional force to the front deck cross member when a large axial force is applied to the front side members.

7. The vehicle front-end body structure as claimed in claim 1, wherein the connecting member is configured to apply a tensional force to the front deck cross member when a large axial force is applied to the front side members.

8. The vehicle front-end body structure according to claim 1, wherein the connecting member is a single member.

9. The vehicle front-end body structure according to claim 1, wherein a middle portion of the connecting member is connected to the pair of front side members respectively to bridge between the pair of front side members.

10. The vehicle front-end body structure according to claim 1, wherein each of the end portions of the connecting member is connected to the front deck cross member spaced away from the respective end portion of the front deck cross member.

* * * * *